(12) United States Patent
Ballantyne et al.

(10) Patent No.: US 8,671,291 B2
(45) Date of Patent: Mar. 11, 2014

(54) METHOD AND DEVICE FOR CHARGING ENERGY STORAGE DEVICES

(75) Inventors: Wayne W. Ballantyne, Coconut Creek, FL (US); Gregory R. Black, Vernon Hills, IL (US); Robert M. Johnson, Lake Zurich, IL (US); Russell L. Simpson, Miami, FL (US)

(73) Assignee: Motorola Mobility LLC, Libertyville, IL (US)

( * ) Notice: Subject to any disclaimer, the term of this patent is extended or adjusted under 35 U.S.C. 154(b) by 174 days.

(21) Appl. No.: 13/160,662

(22) Filed: Jun. 15, 2011

(65) Prior Publication Data

US 2012/0173910 A1 Jul. 5, 2012

Related U.S. Application Data

(60) Provisional application No. 61/428,241, filed on Dec. 30, 2010.

(51) Int. Cl.
*G06F 1/26* (2006.01)
(52) U.S. Cl.
USPC ............................ 713/300; 713/310; 713/340
(58) Field of Classification Search
USPC .......................................... 713/300, 310, 340
See application file for complete search history.

(56) References Cited

U.S. PATENT DOCUMENTS

| | | | |
|---|---|---|---|
| 6,300,744 B1 | 10/2001 | Shum | |
| 6,507,172 B2 | 1/2003 | Sherman | |
| 6,946,817 B2 | 9/2005 | Fischer et al. | |
| 7,007,127 B2* | 2/2006 | Lin | 710/315 |
| 7,631,111 B2 | 12/2009 | Monks et al. | |
| 2003/0163628 A1* | 8/2003 | Lin | 710/315 |
| 2006/0119320 A1 | 6/2006 | Nork et al. | |

(Continued)

FOREIGN PATENT DOCUMENTS

EP 1659478 A1 5/2006

OTHER PUBLICATIONS

Patent Cooperation Treaty, International Search Report and Written Opinion of the International Searching Authority for International Application No. PCT/US2011/066578, Apr. 3, 2012, 11 pages.

(Continued)

*Primary Examiner* — M Elamin
(74) *Attorney, Agent, or Firm* — Gary J. Cunningham (57) ABSTRACT

Disclosed is a method (200) for charging energy storage devices. The method (200) can include a battery charging method in a power supply client connected by a data bus to a power supply host. The method (200) includes the steps of: detecting (210) a state of the power supply host; determining (220) a limit of current from the host to the client; allocating (230) a portion of the limit to a battery charging current; and charging (240) a battery of the client at the battery charging current such that the current from the host is greater than a recommended limit and less than or equal to the determined amount. Thus a client device can confidently charge at a rate which causes the port current to exceed a recommended limit, such as a USB port limit of 500 mA, when allowed by conditions of the host device. Advantageously, the method can help to expedite the charging time of a client battery, notwithstanding the number of other clients connected to the same host device for charging, thus minimizing the wait time of a user.

14 Claims, 5 Drawing Sheets

(56) References Cited

U.S. PATENT DOCUMENTS

2007/0143505 A1   6/2007   Terrell, II
2010/0205463 A1   8/2010   Magnusson
2011/0239029 A1   9/2011   Murakami et al.

OTHER PUBLICATIONS

Sherman, Len: "Charge Your Battery Faster by Using a USB Port", Power Electronics Technology, Jan. 2004, www.powerelectronics.com, pp. 34-40.

* cited by examiner

METHOD AND DEVICE FOR CHARGING ENERGY STORAGE DEVICES

BACKGROUND

Field

The present disclosure relates to a method and device for charging energy storage devices.

INTRODUCTION

As background, a hub, such as a Universal Serial Bus (USB) hub, is a device that expands a single USB port into several so that there are more ports available to connect devices to a host system. See www.usb.org for more details.

USB Hubs are often built into equipment such as computers, wireless communication devices, keyboards, monitors, printers and the like. When such a device has many USB ports they all usually stem from one or two internal USB hubs rather than each port having independent USB circuitry. This is a very common implementation in Personal Computers (PCs).

Physically separate USB hubs come in a wide variety of form factors: from external boxes (looking similar to a network hub) connectible with a long cable, to small designs that can be directly plugged into a USB port. In the middle case, there are "short cable" hubs which typically use an integral 6 inch cable to slightly distance a small hub away from physical port congestion and of course increase the number of available ports.

Laptop computers may be equipped with many USB ports, but an external USB hub can consolidate several everyday devices (like a mouse and a printer) into a single hub to enable one-step attachment and removal of all the devices.

A bus-powered hub is a hub that draws all its power from the USB host, such as a computer's USB interface. It does not use a separate power connection. However, many devices require more power than this method can provide, and will not work in this type of hub.

The USB 2.0 specification states current (related to power) is allocated in units of 100 mA up to a maximum total of 500 mA per port. (The USB 3.0 specification states that the current is allocated in units of 150 mA and maximum of 900 mA per port. While many of the concepts and examples in this document relate to the USB 2.0 specification, as should be understood, they equally apply to USB 3.0, with the values being different.) Therefore a compliant bus powered hub can have no more than four downstream ports, each having a recommended limit of 100 mA, and cannot offer more than four 100 mA units of current in total to downstream devices (since one unit is needed for the hub itself). If more units of current are required by a device than can be supplied by the port it is plugged into, the operating system usually reports this to the user.

In contrast a self-powered hub is one that takes its power from an external power supply unit and can therefore provide full power (up to a recommended limit of 500 mA) to every port. Many hubs can operate as either bus powered or self powered hubs.

However, there are many non-compliant hubs on the market which announce themselves to the host as self-powered despite really being bus-powered. Equally there are plenty of non-compliant devices that use more than the 100 mA recommended limit without announcing this fact (or indeed sometimes without identifying themselves as USB devices at all). These hubs and devices do allow more flexibility in the use of power (in particular many devices use far less than 100 mA and many USB ports can supply more than the 500 mA recommended limit before going into overload shut-off) but they are likely to make power problems harder to diagnose.

Some powered hubs do not supply enough power to support a 500 mA load on every port. For example, many 7 port hubs come with a 1 A power adapter, when in fact seven ports could draw a maximum of 7×0.5=3.5 A, plus power for the hub itself. The assumption is that the user will most likely connect many low power devices and only one or two requiring a full 500 mA.

There is a need for an improved method and device for charging energy storage devices. For example, with battery capacities continuing to grow for electronic devices, such as smart phones, tablets and the like, it takes a longer charging time. For example, for USB charging with a 500 mA limited USB supply it takes longer to charge a client battery. It would be considered an improvement in the art, if a client device with a client battery could be charged more rapidly notwithstanding the number of clients connected to a USB hub, without adversely affecting the hub and client device battery.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
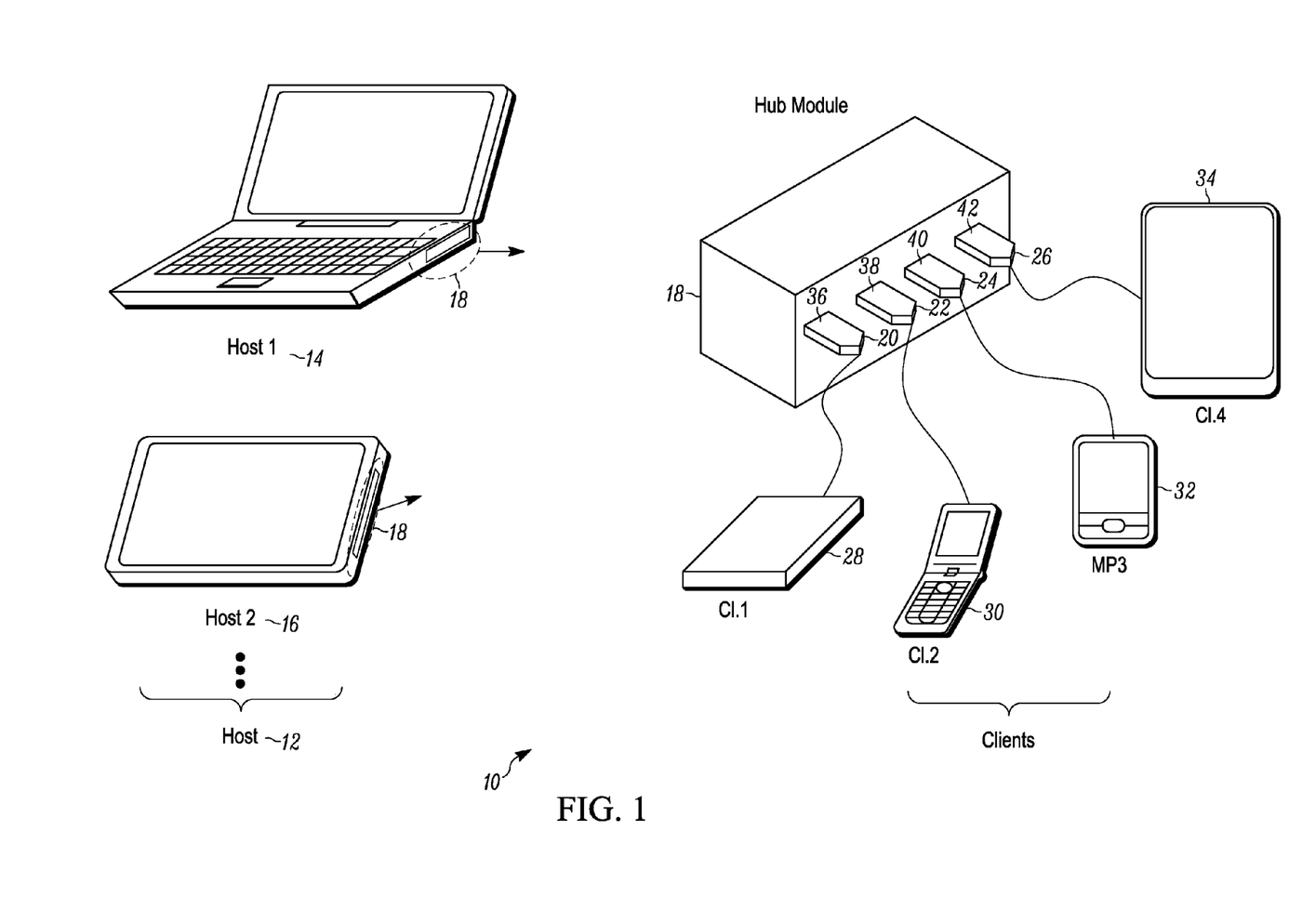
FIG. 1 is an exemplary device for charging energy storage devices. It includes a host with an enlarged hub module having four USB ports connecting the clients to the host, according to one embodiment.

FIG. 1 is an exemplary USB charging system 10 for charging one or more energy storage devices. The system 10 includes a host 12, such as host 1, item 14 in the form of a laptop; host 2, item 16 shown as a tablet or smart phone, shown with an enlarged hub module 18 shown with four USB ports 20, 22, 24 and 26 connecting clients 1-4 28, 30, 32 and 34 to the host 12, via the module 18 and USB connectors 36, 38, 40 and 42. As should be understood by those skilled in the art, various ports and connectors can be utilized in connection with the invention.

Figure 2:
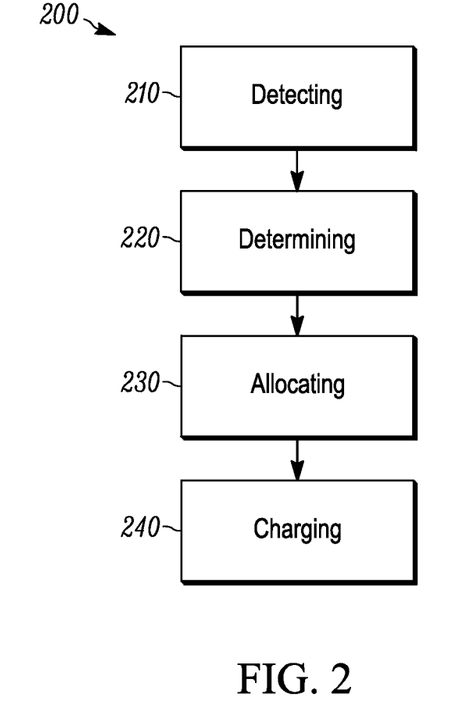
FIG. 2 is an exemplary block diagram of a method for charging energy storage devices according to one embodiment.

FIG. 2 is an exemplary block diagram of a method 200 for charging energy storage devices according to one embodiment. The method 200 includes a battery charging method in a power supply client connected by a data bus to a power supply host. The method 200 includes the steps of: detecting 210 a state of the power supply host; determining 220 a limit of current from the host to the client; allocating 230 a portion of the limit to a battery charging current; and charging 240 a battery of the client at the battery charging current such that the current from the host is greater than a recommended limit and less than or equal to the determined amount. Thus a client device can safely charge at a rate which causes the port current to exceed a recommended limit, such as a USB port limit of 500 mA, when allowed by conditions of the host device. Advantageously, the method can help to expedite the charging time of a client battery, notwithstanding the number of other clients connected to the same host device for charging, thus minimizing the wait time of a user.

In one embodiment, the detecting step 210 includes querying the power supply host for information via the data bus, the information comprising at least one of: a current capability limit; a model identifier; a limit number of connected clients; and a count of presently connected clients.

This feature can help to safely expedite charging, notwithstanding the fact that other clients may also be charging. Thus, as a result of the querying step, if the client device determines that it is the only client connected to the host device, it can utilize the full capability of the host power supply, thereby charging its battery more quickly than if other clients were active. Even if other clients are active, it can utilize an amount of current greater than the recommended amount, up to the host capability amount minus an allocation to the other active clients.

In one use case, the determining step 220 includes receiving information from the host device via the data bus, the information comprising at least one of: a current capability; a model identifier; a limit number of connected clients; and a count of presently connected clients. Thus charging can be customized based on the particular client to be charged, for example.

Current capability information received from the host via the data bus may include the aggregate capability to supply current to all of the host ports. The limit number of connected clients may be the total number of host ports, and the count of presently connected clients may be the number of host ports presently connected to active clients. Information about the amount of current being supplied to each client, less than the allocated amount, may also be provided by the host. For example, a first number of connected clients allocated a maximum amount may be provided, and a numbers of connected clients allocated a lesser amounts, such as 500 mA and 100 mA may also be provided. Alternatively, the aggregate current capability and number of ports may be determined from a database indexed by the model identifier information received via the data bus from the power supply host. The client may use additional information about the number of active clients, and client allocation amounts to determine the current capability at the connected port. For example, if only the host model is indicated then the client may determine from a data base the amount of current that can be provided assuming clients are connected to all of the ports.

If additionally the number of connected clients is indicated, the client may determine a higher amount of current can be provided when the number of connected clients is less than the total number of ports.

If additionally it is indicated that one or more connected clients is drawing an amount of current less than a limit amount, the client may determine an even higher amount of current can be provided.

Alternatively the current capability information received from the host via the data bus may include the present capability to supply current to the connected port, taking into account the present loading of the other ports. Thus alternative methods are provided for increasing the charging current in a client device, depending on the data available via the data bus about the host capability and presently connected clients, even if this information is not consistent among different host models.

Preferably, the step of receiving information above, includes receiving a response to a request for information from the host. Thus after attaching to the host the device may initially draw up to the recommended current limit, and then after receiving a response from an information query it may begin drawing a first amount exceeding the recommended limit. The host may also send the information over the data bus without the client sending a query message. For example it may send information such as the port current limit or a model identifier automatically when the client device is connected. In addition, in a preferred embodiment, the step of receiving information includes receiving a change notification from the host, the change notification comprising at least one of: a current capability; a number of presently connected clients; and an amount of current being supplied to presently connected devices. Thus the host may spontaneously send new information, for example when another client is attached or goes active, or when another client is removed or goes inactive, or when the amount of current being supplied to another client changes. In particular, the change in the amount of current being supplied may be indicated by a change of power classification. Examples of power classifications may include: devices requiring a maximum allocation; devices requiring a first recommended limit such as 500 mA, and devices requiring a second recommended limit such as 100 mA. A power classification may change, for example, when a client starts or stops charging. Thus after receiving new information from the host, the device may begin to draw a different amount of current from the host device which may be less than or more than the previous amount. Advantageously, multiple clients can be safely charged at a rate exceeding a recommended rate, for reduced charging time.

In a preferred embodiment, the determining step 220 includes a data base look up of current capability indexed to at least one of: the model identifier; and the count of presently connected clients. Upon receiving this information the client may consult a database for port supply limits. For example the client may determine the aggregate host supply capability of the host by a database look-up power supply capability indexed to host model identifiers. The port current limit may then be calculated as a function of the aggregate host supply capability and the number of presently connected clients.

Alternatively a port current limit may be determined directly from a database look-up of port current capability indexed to the host model identifier and the number of presently connected clients. Thus alternative methods are provided for increasing the charging current in a client device, depending on the data available via the data bus about the host capability and presently connected clients, even if this information is not consistent among different host models.

As should be understood, the data bus can vary and is preferably a USB data bus which has been widely adopted on PCs and other host devices as well as power supply devices whose sole purpose is charging of USB clients. In one embodiment, this invention is particularly adapted for use in connection with USB use cases and a USB data bus, for reduced charging times.

In an USB data bus use case, the recommended limit is about 500 mA or about 900 mA, which is generally in compliance with the USB 2.0 and 3.0 specifications, respectively. In one use case, the allocating step 230 includes subtracting an overhead current from the limit current, wherein the overhead current is an amount of current allocated when an additional client is connected to the host.

In a first example, the USB host is capable of providing an aggregate current of 1500 mA to its output ports, and the overhead current is the amount needed to provide the same amount of current to each connected client. Thus the overhead current and the current allocated to the client device are the same. The overhead current is subtracted from the aggregate current limit to determine the allocated port current. Thus, when one client is connected to the host, the overhead current is the aggregate current capability divided by two, and more generally when n devices are connected the overhead current is the aggregate current divided by n+1. Thus when one client is connected its allocated port current is 1500 mA/2, or 750 mA. When two clients are connected each may have an allocated current of 1500 mA/3, or 500 mA.

In a second example, the USB host is capable of providing an aggregate current of 1500 mA to its output ports, and the overhead current is the recommended limit of 500 mA. The allocation method of the second example imposes a limitation that subsequently connected clients draw an amount not exceeding the recommended limit, at least initially. When there is only one active client, the 500 mA overhead current is subtracted from the aggregate output current limit, for an allocated port current of 1000 mA. When a second client is connected to the host it initially draws less than the recommended limit of 500 mA, and the aggregate current to the ports is less than aggregate current limit of 1500 mA. In a subsequent step the current allocations may be reduced to provide overhead current for a possible third client. Thus, after the second client is connected, the current allocation to the first device is reduced to 500 mA. If a third device is connected it initially draws less than the recommended limit of 500 mA, and the aggregate current and the aggregate current output is 500 mA×3 which is the aggregate current limit of 1500 mA.

Advantageously in the first and second examples, the amount of current that a client device can draw from the host can exceed the recommended limit, by an amount depending on the total number of connected clients.

Also in one use case, the allocating step 230 includes subtracting an operating current from the limit current, wherein the operating current is an amount of current dissipated in the client device. Thus, in determining port current allocations an operating current less than the allocated current can be assumed for the previously connected devices, thereby enabling a higher allocation for new connections. In this way a device which does not use the full allocation, such as device which is not charging a battery, can be allocated less current, thereby enabling a higher allocations for the other clients. In a preferred embodiment, the client device sends information to the host device via the data bus indicating its present operating current. Consequently the host device provides information to the other clients enabling higher current allocations. For example the host device may provide a reduced allocation current amount directly to the other devices, or indirectly by indicating a reduced allocation to one or more other devices.

Figure 3:
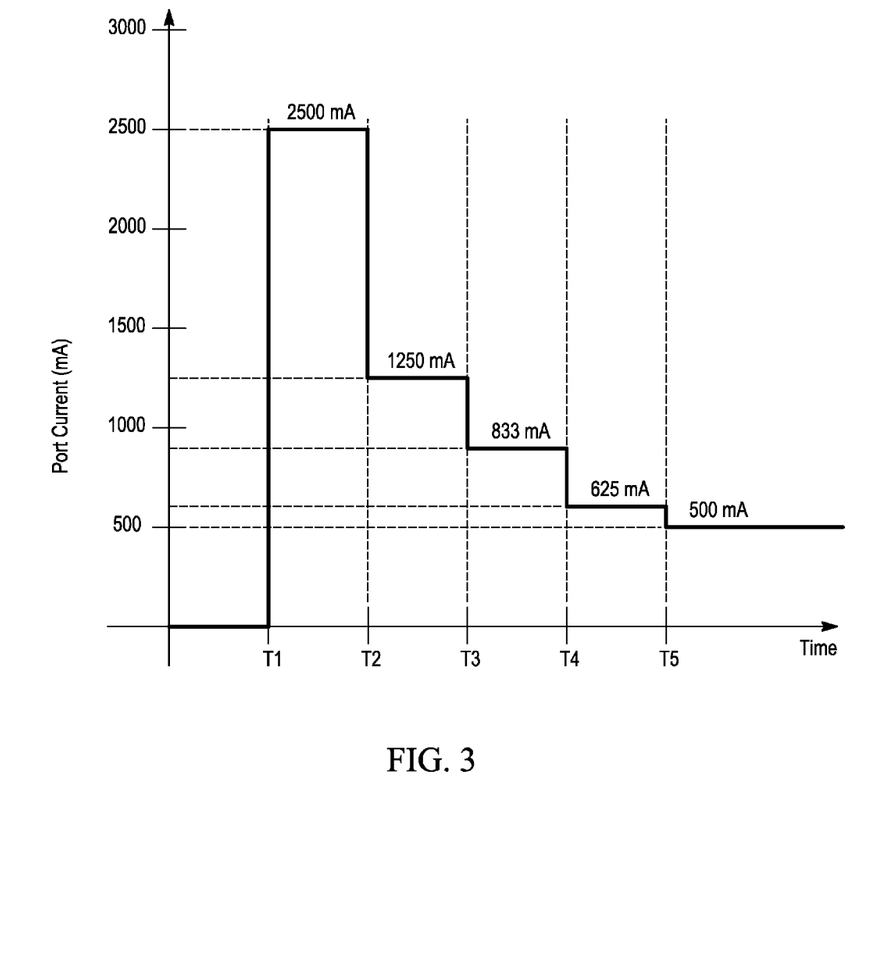
FIG. 3 is an exemplary timeline showing current available from a host device to client devices according to one embodiment.

FIG. 3 is an exemplary timeline 300 illustrating the example USB port current allocations versus time according to one embodiment. In this example the USB host has a power supply capable of an aggregate output current limit of 3000 mA. Initially, as indicated at T=0 of the timeline, there are no clients connected and the aggregate current allocation is zero. At time T1 a first client is connected. The current allocation to the first client is the aggregate output current limit of the host, minus an overhead current of 500 mA held in reserve for future connections. Thus at time T1 the current allocation is the aggregate limit minus the recommended limit, 3000 mA−500 mA, or 2500 mA. At time T2 a second client is connected and the current allocation is divided between the first and second client. Thus at time T2 the current allocation is the aggregate limit minus the recommended limit divided by 2, (3000 mA−500 mA)/2, or 1250 mA. At time T3, a third client is connected and the current allocation is divided between the first, second and third clients. Thus at time T3 the current allocation is the aggregate limit minus the recommended limit divided by 3, (3000 mA−500 mA)/3, or 833.3 mA. Finally at time T4, a fourth client is connected and the current allocation is divided between the first, second, third and fourth clients. Thus at time T4 the current allocation is the aggregate limit minus the recommended limit divided by 3, (3000 mA−500 mA)/4, or 625 mA. By comparison, in an existing host the port current allocation is the recommended limit of 500 mA at each point in time. Thus in the proposed method, even with four devices attached, the allocated current is increased and charge times are reduced versus with the existing host with current allocations constrained to the recommended limit of 500 mA at each point in time.

Figure 4:
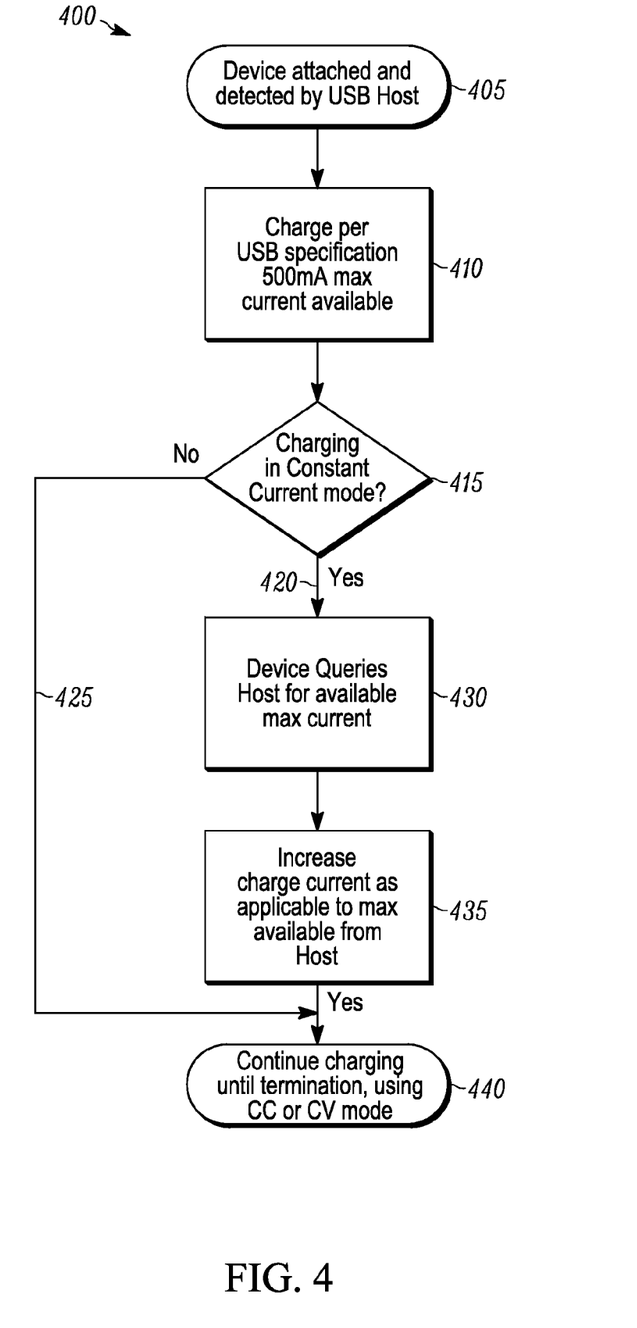
FIG. 4 is an exemplary flow chart of a method for charging energy storage devices according to one embodiment.

FIG. 4 is an exemplary flowchart 400 illustrating the operation of a query of the host for available current, according to one embodiment. In the flow chart 400, the process begins at block 405 when a USB device, such as a Mobile Subscriber Client (MS) or any client, is connected and detected by a USB Host, such as a PC laptop, tablet, smartphone and the like with multiple USB ports. This detection can be accomplished via well-known methods. At block 410 charging per a USB specification begins. For example, a MS will first enumerate and request 500 mA current capability from the USB Host 5V Vbus supply (typically, initially only 100 mA may be allowed.)

Continuing with the flowchart 400, a decision diamond 415 is next reached, and the query is whether to charge in constant current mode? If No, line 425 is followed to block 440. A charge algorithm can start up immediately in "CV" Constant Voltage top off mode, where the battery voltage is monitored and charge current is much less than the current available from a normal USB port. In this case, the flow chart has branched to a final state 440 in CV mode.

If the answer is Yes, at line 420, at decision diamond 415, the battery is likely in a state needing a charge. In this instance, CC (Constant Current) charging can commence. This can involve the MS trying to draw as much current from the USB Host as possible, up to for example, a limit, such as a maximum charge rate limit of the device's battery (generally over 1 A with today's cell phone batteries), or other limits imposed by thermal dissipation concerns. In any case, the desired CC current setting can be more than the 500 mA maximum provided by USB Host Vbus supply. (For example, a USB Wall Charger can provide 850 mA).

Next, in block 430, after determining that the MS is in CC mode, the MS can query the Host and learn how much Vbus current is actually available at the time. For example, as is often the case, a USB Host Vbus supply may be designed to support 4 USB ports at 500 mA each. Thus, if the MS is the only device connected to the USB ports, the USB Host could provide additional current, theoretically providing 1700 mA to the MS (allowing for 100 mA to each of the other devices if eventually connected.) So, in the Query block 430 above, the USB Host can advise the MS as to what current is available. In block 435 the charge current can be increased to a maximum available from a host. Next, in block 440, charging continues in a desired manner, such as according to a charge algorithm, until charging is complete.

In one embodiment, in the event other USB clients are subsequently connected, and each requests 500 mA of current, the host can "give back" some or all of the extra current allocation.

Figure 5:
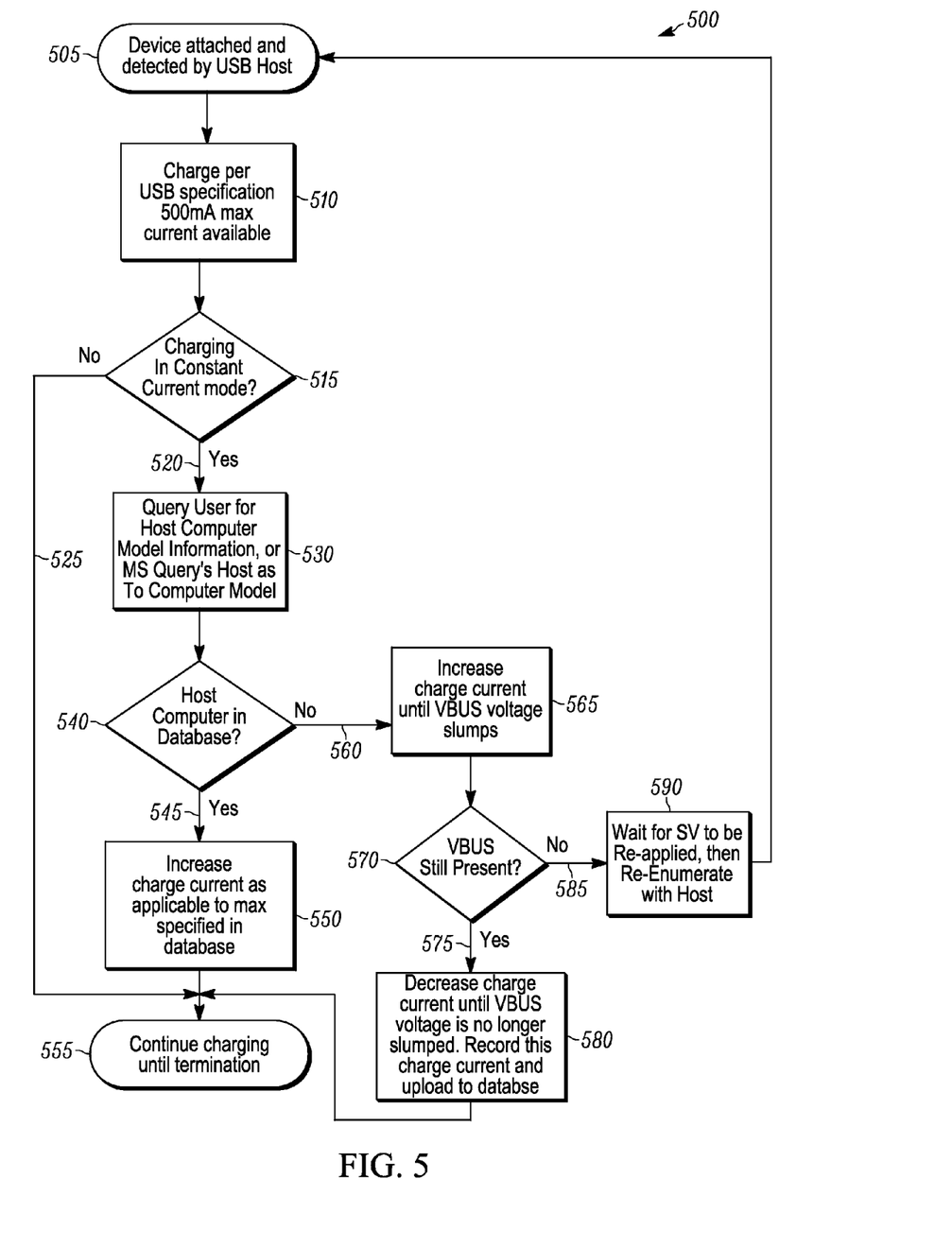
FIG. 5 is an exemplary flow chart of a method for charging energy storage devices according to one embodiment.

There are at least a couple of ways this can be accomplished, for example. First, the USB Host can arbitrarily take back the current to the MS Vbus supply. If a MS (client) is being charged, the MS is usually sensing Vbus current and would not require it to power critical subsystems. That is, if the charge current to the battery is suddenly lowered, minimal or no radio dysfunctionality should occur, it would simply take longer to charge. Second, new USB Host to MS (client) messaging can be utilized to allow the Host to announce to the MS (client) that its "extra" current allocation, is being cut back. It could be cut back to 500 mA, a preferred available amount, or a current higher than 500 mA, but less than the present allocation. Continuing from the example above, if the MS (client) requests and receives 1700 mA, and then another USB device is connected to another USB Port sharing the same internal Vbus supply on the PC, the new device would potentially request for 500 mA and the MS's allocation could be cut from 1700 to 1300 mA (allowing for the two unused ports to have 100 mA available upon default). Turning now to FIG. 5, the flow chart 500 process begins at block 505 when a client/device is attached and detected by a Host. At block 510 a charge is begun per a USB specification, usually about 500 mA maximum current available. Continuing with the flowchart 500, a decision diamond 515 is next encountered, and the inquiry is whether to charge in constant current mode? If No, line 525, is followed to block 555, to continue charging until termination.

If Yes, at line 520, a block 530 queries User for host computer model information, or MS Query's host as to computer model. In block 530, the computer model can be determined. This can be performed via a User Query (e.g., pop-up menu), or via a USB message to let the MS query for the Host for the Computer Make and Model. Knowing the computer Make/Model, the MS then performs a query of a database showing maximum available USB current for a given Make/Model. Alternatively, a "user-generated" database can be provided, where users or 3rd parties have pre-characterized the maximum available current from various PCs, and loaded the numbers into a database. This "collaborative" database approach is helpful since, PC vendors would unlikely advise of any USB Vbus current beyond a specification In one embodiment, the database can be a remote database stored in a Web-based or Enterprise server, but it could also be a local copy stored on the MS itself.

Continuing, a decision diamond 540 is next reached. The question is, is the host computer in database. If yes, line 545, the PC Make/Model to which the MS is connected to is in the database. Next, the charge current is increased in block 550, as applicable, to a maximum specified in the database. For example, an MS in block 550 can read out a maximum current available from the database and use it to charge the battery in the continue charging until termination block 555, subject to other maximum current limitations detailed herein. The charge algorithm then continues as normal until charging termination in block 555 is achieved.

Referring back to decision diamond 540, if the host computer is not in the database, or the answer is No, line 560, block 565 is encountered where charge current is increased, for example, until VBUS voltage slumps.

Continuing down this path, decision diamond 570 is encountered, and the question is, is VBUS present? If Yes, line 575, then in block 580 charge current can be decreased until VBUS voltage is no longer slumped. The charge current can be recorded and uploaded into the database. For example, an MS then tests the Vbus supply by slowing the increase of the charge current until Vbus slumps to a certain preset threshold. Once this current threshold is found, the charge current is decreased slightly to provide some Vbus margin and allow for statistical variation of different V-I load curves of Host Power Supplies for the same PC Make/Model. This final "backed off" charge current in block 580 is written to the charge current database for that PC Make/Model.

Referring back to decision diamond 570, if the answer is No, at line 585, then block 590 is reached, and there is a need to re-enumerate with the host. For example, certain PCs can disconnect Vbus abruptly if too much current is drawn, and the MS must start over and wait for Vbus to be re-applied, then re-enumerate, as shown in block 590. To avoid this, the charge current can be increased in small increments and the Vbus voltage monitored carefully. If the PC does disconnect Vbus, this can also be uploaded into the database along with the current at which disconnect occurred.

An important aspect shown in FIG. 5, is the "collaborative" PC vs Charge Current database which can be created and updated by users, or 3rd parties. In one embodiment, even if the PC Make/Model is in the database, the method can include re-measuring the available current and uploading to the database as another point to be averaged.

In one embodiment, the method can include uploading an "error flag" to the database in case a discrepancy is observed, for example, database current readout for the PC Make/Model leads to excessive Vbus slump when used for charging.

The devices and method herein are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The invention claimed is:

1. A battery charging method in a power supply client connected by a data bus to a power supply host, comprising the steps of:
   detecting a state of a power supply host;
   determining a limit of current from the power supply host to a client, by:
   receiving information from the host power supply via a data bus, the information comprising at least one of: a current capability; a model identifier; a limit number of connected clients; and a count of presently connected clients; and accessing a remote data base look up via a server of current capability indexed to at least one of: the model identifier; and the count of presently connected clients;
   allocating a portion of the limit to a battery charging current in the power supply host; and
   charging a battery of the client at the battery charging current such that the current from the power supply host is greater than a recommended limit and less than or equal to the determined amount.

2. The method of claim 1, wherein the determining step includes receiving information from the power supply host via the data bus, the information comprising a current capability; a model identifier; a limit number of connected clients; and a count of presently connected clients.

3. The method of claim 2 wherein the step of receiving comprises receiving a response to a request for information from the power supply host.

4. The method of claim 2 wherein the step of receiving comprises receiving a change notification from the power supply host, the change notification comprising: a current capability; and a number of presently connected clients.

5. The method of claim 2, wherein the determining step includes a data base look up of current capability indexed to at least one of:
   the model identifier; and
   the count of presently connected clients.

6. The method of claim 1 wherein the data bus is a USB data bus.

7. The method of claim 1 wherein the recommended limit is about 500 mA or 900 mA.

8. The method of claim 1 wherein the allocating step includes subtracting an overhead current from the limit current, wherein the overhead current is an amount of current allocated when an additional client is connected to the host.

9. The method of claim 1 wherein the allocating step includes subtracting an operating current from the limit current, wherein the operating current is an amount of current dissipated in the client device.

10. The method of claim 1 wherein even if a PC make or model is in the database, re-measuring the available current and uploading to the database as another point to be averaged.

11. The method of claim 1 further comprising uploading an "error flag" to a database in a case when a discrepancy is observed.

12. The method of claim 1 wherein the remote database look up is stored in a server.

13. The method of claim 1 wherein the remote database look up is stored in a Web-based server or an Enterprise server.

14. The method of claim 1 wherein the remote database look up is copied to a local copy stored on the client.

* * * * *